United States Patent
Irie

[11] Patent Number: 5,926,541
[45] Date of Patent: Jul. 20, 1999

[54] APPARATUS AND METHOD FOR CHECKING SIGNALS

[75] Inventor: Kenji Irie, Kanagawa, Japan

[73] Assignee: Sony Corporation, Tokyo, Japan

[21] Appl. No.: 08/855,701

[22] Filed: May 8, 1997

[30] Foreign Application Priority Data

May 10, 1996 [JP] Japan .................................. 8-139776

[51] Int. Cl.⁶ .................................................. H04M 1/00
[52] U.S. Cl. ...................... 379/372; 379/93.35; 379/142; 379/215; 379/354; 379/386
[58] Field of Search ................. 379/93.35, 142, 379/215, 372, 354, 386

[56] References Cited

U.S. PATENT DOCUMENTS 5,519,774  5/1996  Battista et al. .......................... 379/386
5,588,052  12/1996 Murata et al. .......................... 379/283

*Primary Examiner*—N. Le
*Assistant Examiner*—Shih-Wen Hsieh
*Attorney, Agent, or Firm*—Jay H. Maioli

[57] ABSTRACT

A method and apparatus to avoid wrong detection when detecting signals including CAS (Call Alert Signal) formed by specific frequencies in the audio range, wherein frequency components forming a specific signal are detected from an input signal, and it is judged whether any signal component other than that of specified frequency range is included or not in entered audio range signal by comparing the energy level of the entered audio range signal with the energy level of only the specified frequency components extracted from the input signal. If any signal component other than that of the specified frequency range is judged to be included as a result of the energy level comparison, the signal is judged not to be the CAS signal.

5 Claims, 7 Drawing Sheets

APPARATUS AND METHOD FOR CHECKING SIGNALS

BACKGROUND OF THE INVENTION

This invention relates to apparatuses and methods for checking specific signal inputs usable, for example, for telephones, more particularly apparatuses and methods for checking inputs of specific signals transmitted as audio signals.

In general telephone communication systems, each telephone transmits/receives talking voices via a public line. In recent years, however, various additional services are developed and put in practical use for such communications.

One of those services is, for example, a service sending caller's data such as telephone number, name, etc. (hereafter, to be referred to as caller ID) to the listener's telephone and enabling the listener to check the caller ID on his/her telephone when receiving the call.

For example, when a listener's telephone is ringing, the telephone station sends the caller ID to the telephone. The telephone decodes the caller ID and displays the telephone number, name, etc. included in the caller ID on the display unit. Then, the listener can check the caller before he/she answers the phone. This will be very helpful for the listener to judge whether to answer the phone and to prevent mischief calls.

In this caller ID sending service, the subject telephone station sends a CAS (Call Alert Signal) to the listener's telephone, notifying that the caller ID is to be sent at first.

Receiving the CAS, the listener's telephone outputs a signal to the telephone station notifying that the telephone is now ready to receive the caller ID. Receiving the signal, the station begins sending of the actual caller ID to the telephone.

Not only at the beginning of the calling, but such a caller ID may be also sent during talking sometimes.

In other words, the service is combined with a call waiting service.

FIG. 1 shows a flow chart of such a service operation.

Assume now that a telephone A is connected to another telephone B for talking through a public line via a telephone station as shown as (S1) in FIG. 1.

If another telephone C makes a call to the telephone A in such a case as shown as (S2) in FIG. 1, then the telephone station sends a ringing sound to the telephone A, as a call waiting service, so that the user of the telephone A can know that another telephone is making a call to his/her telephone A even while he/she is talking with the telephone B. In this case, the user of the telephone A can know who the present caller is by the caller ID of the telephone C sent by the telephone station.

In order to send this caller ID, the telephone station mutes the caller voice (S3) sent from the telephone B to the telephone A and sends a CAS to the telephone A (S4).

Detecting the CAS (S5), the telephone A mutes the voice being sent to the telephone B (S6) to which the user of the telephone A is talking, then sends a CAS confirmation signal to the telephone station (S7).

Receiving the CAS confirmation signal, the telephone station sends the caller ID of the telephone C (S8) to the telephone A, then resets the mute (S9). On the other hand, the telephone A resets the mute (S10) when receiving the caller ID, with which the communication between telephones A and B is restored to the normal status (S11).

It is only 0.3 to 0.4 sec that the communication is muted and disconnected temporarily in such an operation. Thus, this will not affect the communication between telephones A and B actually at all.

Receiving the caller ID, the telephone A decodes the caller ID and displays the number, user name, etc. of the telephone C on the display unit (S12). Consequently, the user of the telephone A can know the caller when a call waiting service is activated during talking.

It is well known that general public lines can transmit audio range signals. To transmit such signals as a dial tone, etc. those public lines use dual tone multifrequency signals (DTMF signals). In other words, one of low frequencies and one of high frequencies are selected respectively for each of numerals and characters and they are combined into a tone signal (dual tone) and transmitted.

The above mentioned CAS and CAS confirmation signal are also defined as dual tone signals. In other words, they are defined as specific signals each of which is generated by a combination of two frequencies. For example, the CAS is defined as a signal comprising two signal components f1 and f2 (frequencies) as shown in FIG. 2A.

So-called caller ID data is sent as an FSK signal.

Even when receiving a CAS from a telephone station during talking as mentioned above, the telephone A is expected to detect the CAS correctly. On the other hand, the telephone A cannot detect any signal other than a CAS as a CAS.

FIG. 3 shows a CAS detecting circuit configuration provided in a telephone so as to detect a CAS comprising signal components as shown in FIG. 2A.

Terminals $L_1$ and $L_2$ are connected to a public line. Signals sent via a public line are entered to the balanced input amplifier 50 provided in the CAS detector shown in FIG. 3 via DC blocking capacitors C1 and C2, as well as via input resistors R1 and R2. The resistor R1 and the capacitor C1, as well as the resistor R2 and the capacitor C2 are combined to form a high-pass filter respectively.

The output from the balanced input amplifier 50 is supplied to the band-pass filters 52 and 53 after its range is limited in the low-pass filter 51. The band-pass filter 52 has a narrow range pass band whose center frequency is f1 shown in FIG. 2A. The band-pass filter 53 has a narrow range pass band whose center frequency is f2.

Consequently, if a CAS as shown in FIG. 2A is sent from a public line, for example, then both the band-pass filters 52 and 53 output signals over a certain level. The detection judging circuit 54 monitors the output from both the band-pass filters 52 and 53. The circuit 54 can obtain both outputs over a certain level, that is, detects that a signal containing both f1 and f2 is entered to the CAS detector. The circuit 54 then outputs the detected information to the time constant circuit 55. The time constant circuit 55 judges a CAS input when both signal components of frequencies f1 and f2 are recognized for over a certain time, then outputs a CAS detection signal $S_{DET}$.

This CAS detection signal $S_{DET}$ is supplied to the controller comprising a microcomputer, etc. in the telephone. The controller controls operations as required according to the CAS detection signal $S_{DET}$. In other words, the controller controls the operations in and after (S5) in FIG. 1.

On the other hand, as for a CAS detection during talking, the circuit as shown in FIG. 3 may make a wrong detection of CAS.

In other words, although a CAS comprises two frequencies in the audio signal range, it is sent as if it were talking voices on the public line during talking. And there are also other talking voice signals containing those two frequencies f1 and f2.

Cider a white noise as shown in FIG. 4A now as a signal containing signal components of frequencies f1 and f2 on a certain level.

If such a white noise is entered to the CAS detector shown in FIG. 3, it becomes, for example, a signal having a range as shown in FIG. 4B when it passes the low-pass filter 51. Furthermore, when passing the band-pass filters 52 and 53, it becomes a signal containing frequencies as shown in FIG. 4C. In other words, it becomes a signal having the same range components as those of the CAS shown in FIG. 2A. In this case, the white noise is mistaken as a CAS.

There is also a case in which audio signals containing frequencies f1 and f2 are transmitted on a public line as normal talking voices (voices output from this telephone or entered to the telephone). As understand from the case shown in FIG. 4, however, when such voices are sent at top volume, signals of frequencies f1 and f2 are extracted from those voice signals and detected wrong as a CAS input sometimes.

SUMMARY OF THE INVENTION

Under such the circumstances, it is the object of this invention to eliminate wrong detection of such specific signals as CAS.

To achieve this object, the signal checking apparatus of this invention used for checking whether or not any specific signal generated from one or more specified audio range frequency signals in the audio signal range is entered is provided with a signal extracting means for extracting specified frequency signals from entered audio range signals; a specific signal frequency detecting means for detecting whether or not there are frequency components forming the object specific signal from the output of the signal extracting means and outputting the detected information; a level difference detecting means for detecting a level difference between the output from the signal extracting means and each input audio range signal and outputting the detected level difference information; and a judging means for judging whether or not the object specific signal is entered according to both information of detected frequency components and information of detected level difference.

In other words, if frequency components forming a specific signal are detected from an input signal, the energy level of the entered audio range signal can be compared with the energy level of only the specified frequency components extracted from the entered signal to judge whether there is any signal components other than those in the specified frequency range in the entered audio range signal. If any signal components other than those in the specified frequency range are contained in the entered audio range signal, the signal can be judged not to be the object specific signal (that is, a specific signal generated from one or more specified frequency signals in the audio signal range).

DETAILED DESCRIPTION OF THE PREFERRED EMBODIMENTS

Subsequently, an embodiment of this invention will be explained with reference to FIG. 5 through FIG. 7, and FIGS. 2A and 2B. This embodiment relates to a telephone equipped with a CAS checking apparatus that can detect the CAS properly.

Figure 5:
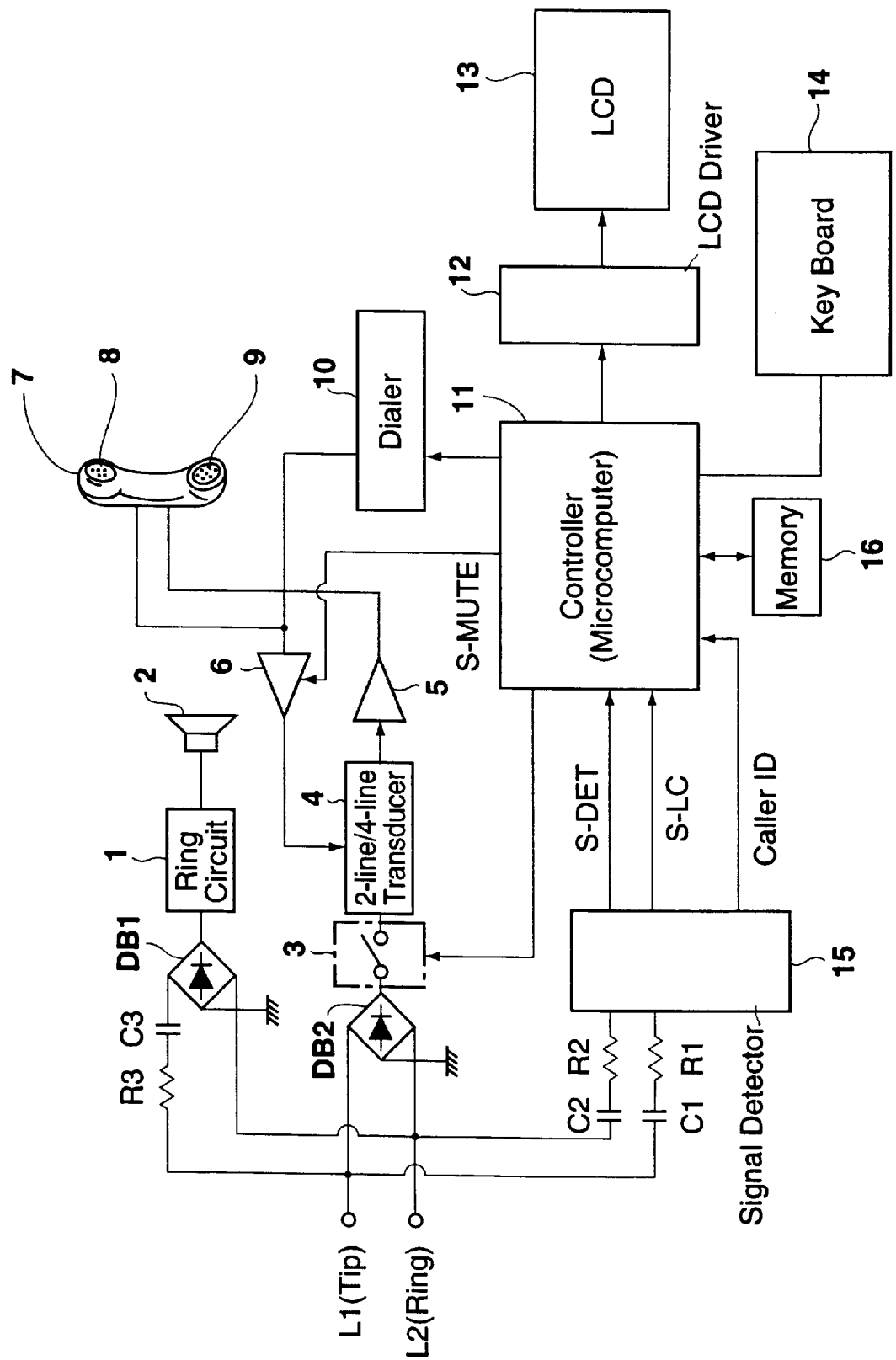
FIG. 5 is a block diagram for a telephone according to an embodiment of this invention.

FIG. 5 is a block diagram of the telephone.

The telephone is provided with a handset 7 used by the user for talking and a display unit 13 (liquid crystal panel). The telephone is also provided with a keyboard 14 having operation keys used for various operations of the telephone; e.g. dial serving, one-touch dial registering, or abbreviated dial registering.

Terminals $L_1$ and $L_2$ are connected to a public line.

Signals are sent/received from/at the telephone via a full-wave rectification diode bridge DB2, a hook switch 3, and a 2-line/4-line transducer 4.

The hook switch 3 is closed to be ready for talking when the handset 7 is picked up or when a hands-free operation is selected.

The terminals $L_1$ and $L_2$ are also connected to the diode bridge DB1 via the resistor R3 and the capacitor C3 that are connected serially. The full-wave rectified output from those terminals $L_1$ and $L_2$ is supplied to the ring circuit 1. When receiving a call, the ring circuit 1 detects the incoming signal and instructs the speaker 26 to output the incoming sounds.

The received audio signal from a telephone line is sent to the speaker 8 provided in the handset 7 from the 2-line/4-line transducer 4 via the amplifier 5, so that it is output as a voice.

When the handset 7 is used, the user's voice is converted to audio signals by the microphone 9 provided in the handset 7. Then, the signals are sent to the 2-line/4-line transducer 4 via the amplifier 6 and output to the telephone line.

The controller 11 comprises a microcomputer and it is used to control the whole operation of the telephone. Operation information from various operation keys on the keyboard 14 of the telephone is supplied to the controller 11. According to the supplied operation information, the controller 11 controls dial outgoing and registration (eg., one-touch dial number registration, etc.), etc.

For dial outgoing, the controller 11 controls the dialer 10 according to the number pressed on the keyboard 14 to issue a dial tone according to the dial number. The issued dial tone is sent to the 2-line/4-line transducer 4 via the amplifier 6 and output to the telephone line.

Specific dial numbers can be registered in the telephone for one-touch dialing, abbreviated dialing, and other useful functions, and those registered dial numbers are saved in the memory 16.

If the keyboard 14 is used for one-touch dialing or abbreviated dialing, the controller 11 reads the dial number specified for the operation and instructs the dialer 10 to generate the dialing tone.

Furthermore, the controller 11 controls the LCD driver 12 for various operations and instructs the display unit 13 to display specified data, for example, numbers when in dialing.

In this embodiment, the controller 11 also controls the LCD driver 12 to display the caller ID, that is, character/numerical information such as telephone number, user's name, etc. according to the received caller ID (to be described later) on the display unit 13.

The specific signal checking apparatus of this invention is also provided with a signal detector 15 used as a unit corresponding to the CAS and caller ID sent from the telephone station.

The signal detector 15 is connected to the terminals $L_1$ and $L_2$ via the capacitor C1, the resistor R1, the capacitor C2, and the resistor R2. In other words, all audio range signals including caller and listener voices sent via the public line are entered to this signal detector 15.

In this embodiment, this signal detector 15 and the controller 11 are combined to form the signal checking apparatus of this invention that can detect CAS inputs correctly.

Figure 6:
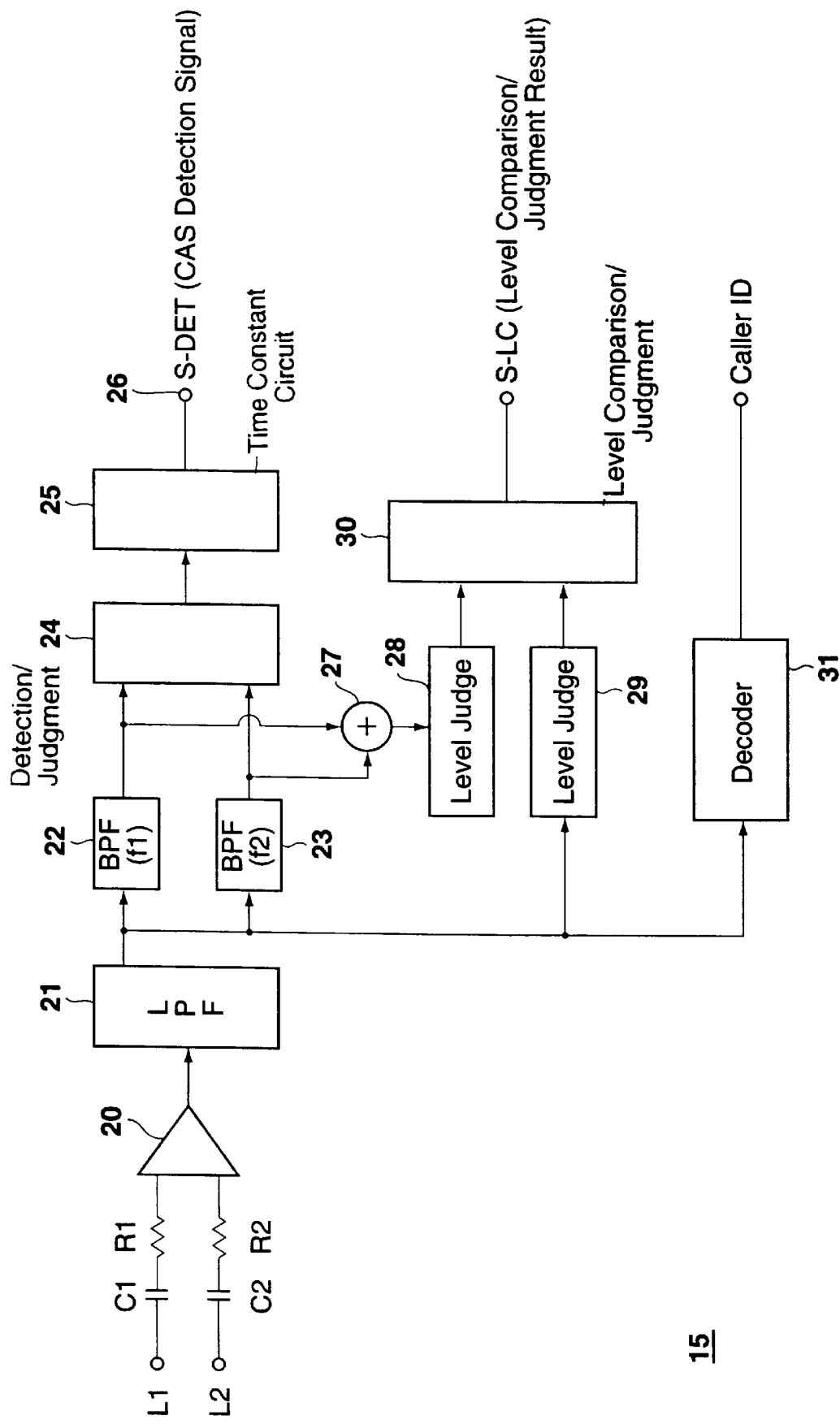
FIG. 6 is a block diagram for a signal detector of the telephone in the embodiment of this invention.

FIG. 6 shows a signal detector circuit configuration.

As shown in FIG. 5, audio range signals sent via the terminals $L_1$ and $L_2$, that is, the public line, are entered to the signal detector 15 via the DC blocking capacitors C1 and C2, as well as via the input resistors R1 and R2. In the signal detector 15, entered audio range signals are supplied to the balanced input amplifier 20 at first as shown in FIG. 6. The resistors R1 and the capacitor C1, and the resistor R2 and the capacitor C2 are combined to form a high-pass filter respectively.

The output from the balanced input amplifier 20 is supplied to the band-pass filters 22 and 23 after its range is limited in the low-pass filter 21.

Figure 2A:
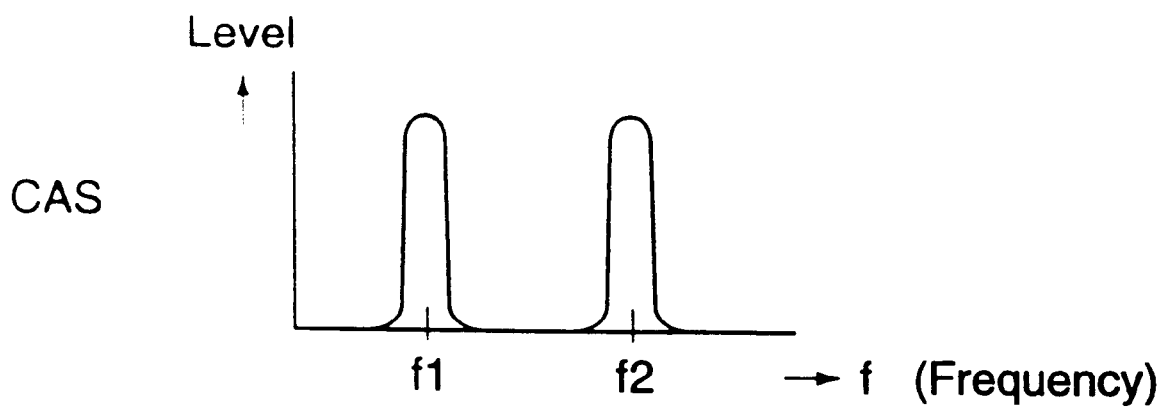
FIGS. 2A and 2B explain a CAS to be detected in the embodiment of this invention and a signal that may be mistaken for a CAS.

The CAS that should be detected by this signal detector 15 is assumed to be defined as a dual-tone signal formed by a combination of signal components of frequencies f1 and f2 as shown in FIG. 2A.

The band-pass filter 22 has a narrow range pass band whose center frequency is f1 shown in FIG. 2A. The band-pass filter 23 has a narrow range pass band whose center frequency is f2. In order to improve the detection sensitivity, the band-pass filters 22 and 23 should be given a high Q value respectively. To achieve this object, they should be digital filters.

The outputs from those band-pass filters 22 and 23 are supplied to the detection judging circuit 24 and the adder 27.

The detection judging circuit 24 is a means for measuring a period between signal zero cross points using, for example, a zero cross timer. It judges whether or not signals entered from the band-pass filters 22 and 23 are object frequency signals. The object frequency means f1 for the output from the band-pass filter 22 and f2 for the output from the band-pass filter 23.

Confirming f1 and f2 inputs, the detection judging circuit 24 outputs the information of detected f1 and f2 to the time constant circuit 25. The time constant circuit 25 then counts the period of continued f1 and f2 signal inputs. If the f1 and f2 signal inputs are observed for over a specified time, the circuit 25 outputs the CAS detection signal $S_{DET}$.

For example, if a CAS as shown in FIG. 2A is sent from the public line, both the band-pass filters 22 and 23 output a signal containing frequencies f1 and f2 over a certain level. The detection judging circuit 24 detects the signal of f1 and f2 frequencies as outputs from the band-pass filters 22 and 23. The time constant circuit 25 then monitors the signal detection period to output the CAS detection signal $S_{DET}$ indicating a CAS input. This CAS detection signal $S_{DET}$ is supplied to the controller shown in FIG. 5.

Figure 4A:
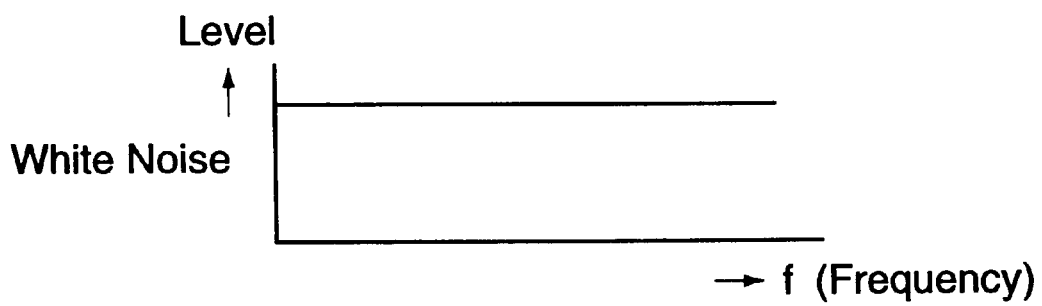
FIGS. 4A, 4B and 4C explain signals that may be mistaken for a CAS.
Figure 4B:
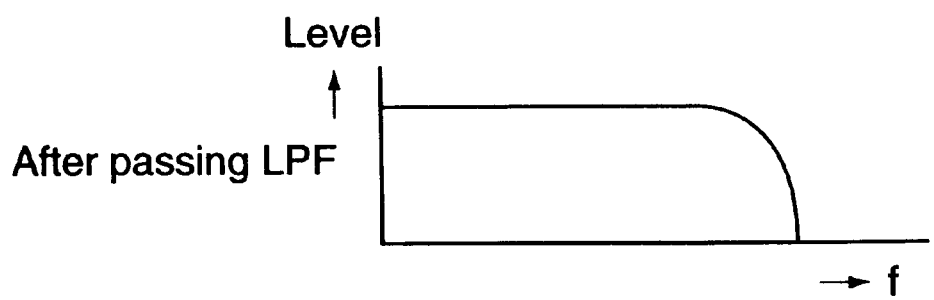
Figure 4C:
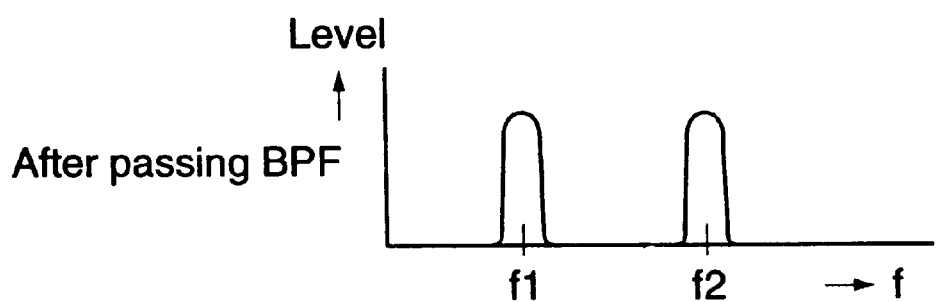

As explained above, however, this CAS detection signal $S_{DET}$ is also issued when a white noise shown in FIG. 4 is entered. If a white noise is entered during talking, for example, the talking voice is mistaken as a signal to issue the CAS detection signal $S_{DET}$ sometimes.

In order to avoid this, therefore, the controller 11 also checks the level comparison/judgment result signal $S_{LC}$ from the level comparing/judging circuit 30 shown in FIG. 6 together with the CAS detection signal $S_{DET}$. The controller 11 does not rely only on the CAS detection signal $S_{DET}$ to judge a CAS input.

The level comparison/judgment result signal $S_{LC}$ is generated according to the operations of the adder 27, the level judging circuits 28 and 29, and the level comparing/judging circuit 30.

The outputs from the band-pass filters 22 and 23 are added up in the adder 27, then supplied to the level judging circuit 28.

The signals entered from the public line, more concretely, the output from the low-pass filter 21, is supplied to the level judging circuit 29.

The level judging circuits 28 and 29 are used to measure the energy level of each entered signal. Concretely, they may be formed as a peak hold circuit respectively.

The level judging circuit 28 outputs the peak hold signal associated with the output from the adder 27 to the level comparing/judging circuit 30. The level judging circuit 29 outputs the peak hold signal associated with the output from the low-pass filter 21 to the level comparing/judging circuit 30.

The level comparing/judging circuit 30 is provided with a subtractor used to compare the output from the level judging circuit 28 with the output from the level judging circuit 29 to detect the level difference and a comparator used to compare the level difference with the specified value.

The output from the comparator becomes a signal indicating a judgment result of whether or not the level difference is over the specified value. The signal is then supplied to the controller 11 as a level comparison/judgment result signal $S_{LC}$.

When thinking about a case in which a CAS as shown in FIG. 2A is sent, the energy distribution will become as shown in FIG. 2A even when the low-pass filter 21 outputs signals, since the signal frequency components of a CAS are concentrated almost in the range of frequencies f1 and f2. Even when the adder 27 that adds up the outputs from the band-pass filters 22 and 23 outputs signals, the energy distribution will become as shown in FIG. 2A.

In other words, a CAS input expects no energy loss in the band-pass filters 22 and 23, although it depends on the characteristics of the band-pass filters 22 and 23. Consequently, the outputs from both the level judging circuits 28 and 29 become approximately the same value. In spite of this, of course, characteristics of the band-pass filters 22 and 23 to be adopted should always be taken into consideration. For example, if a normally supplied CAS loses an energy of 2 to 3 dB when it passes the band-pass filters 22 and 23, a difference appears between outputs from the level judging circuits 28 and 29. If this difference is 9 dB or under, they may be regarded to be the same value.

Consequently, as explained above, the level comparing/judging circuit 30 compares the output from the subtractor that detects each level difference between the level judging circuits 28 and 29 with the specified value in the comparator. The specified value to be assumed as a criterion in the comparator may be set to 9 dB, for example.

As a result, when a CAS is entered, the level comparison/judgment result signal $S_{LC}$ output from the level comparing/judging circuit 30 becomes a signal indicating "no level difference detected".

Figure 2B:
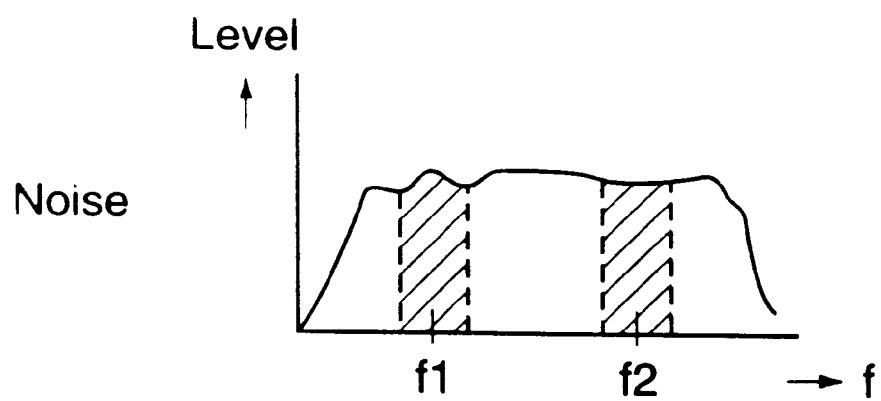
Figure 3:
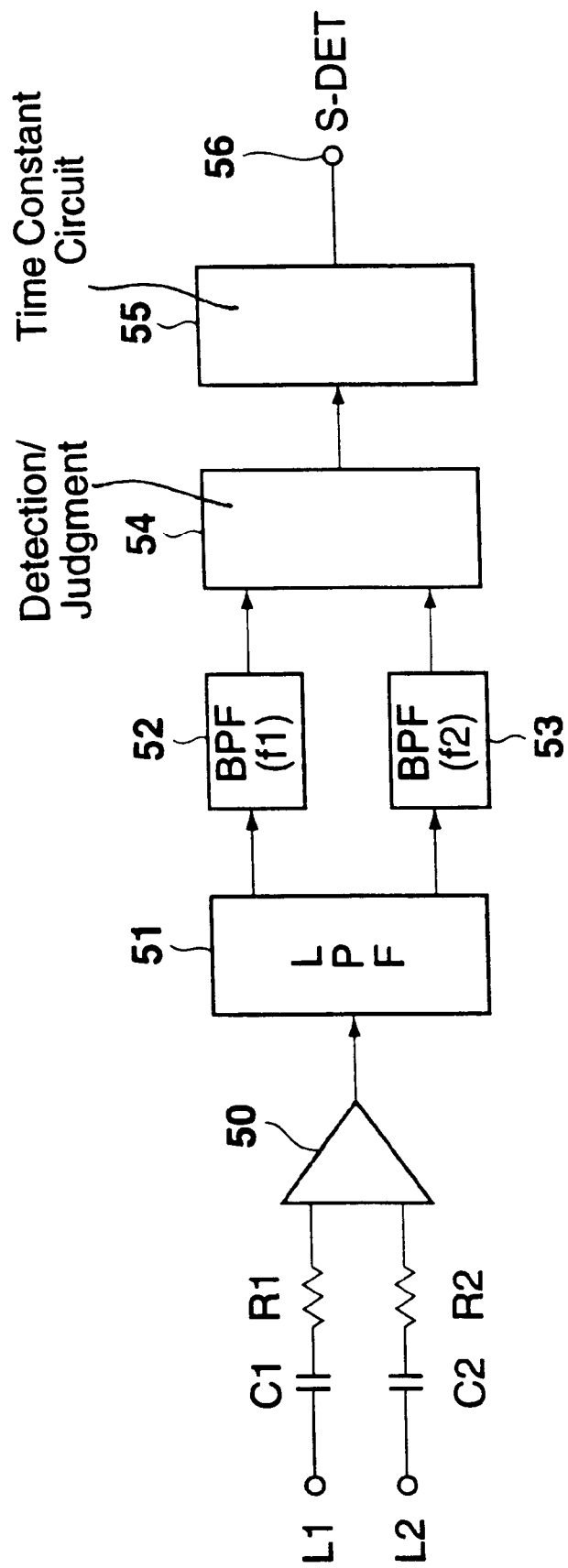
FIG. 3 is a block diagram for a prior art CAS detector.

On the other hand, if an audio signal containing frequencies f1 and f2 as shown in FIG. 2B is entered as a caller's voice, for example, the energy distribution will be as shown in FIG. 2B when the low-pass filter 21 outputs signals.

In this case, when the band-pass filters 22 and 23 extract bands whose center frequencies are f1 and f2, the energy level becomes a level equivalent to a sum of each of the kinked-line areas when the adder 27 that has added up the outputs makes an output.

Consequently, the difference between the energy levels judged by level judge circuits 28 and 29 becomes large (9 dB or over), and the level comparison/judgment result signal $S_{LC}$ output from the comparator provided in the level comparing/judging circuit 30 becomes a signal indicating "level difference detected", that is, indicating that a significant level degradation has occurred by the band-pass filters 22 and 23.

The output from the level comparing/judging circuit 30 generated in such a way is supplied to the controller 11 together with the CAS detection signal $S_{DET}$ mentioned above. The controller 11 then recognizes the CAS signal through the processing shown in FIG. 7, for example.

The controller 11 monitors input of the CAS detection signal $S_{DET}$ as a CAS detection processing in step F101.

If the CAS detection signal $S_{DET}$ is entered from the signal detector 15, the controller 11 begins checking whether or not the CAS detection signal $S_{DET}$ is entered continuously, for example, for 30 msec in step F102.

As mentioned above, the time constant circuit 25 confirms that signals containing frequencies f1 and f2 are entered continuously over the specified time using the detection judging circuit 24 to output the CAS detection signal $S_{DET}$. In this case, however, if the time constant circuit 25 is assumed to issue a CAS detection signal $S_{DET}$ according to a continuous detection of f1 and f2 inputs, for example, for over 30 msec, the processing of the controller 11 in step F102 may be omitted. If the controller 11 checks a continuous input of f1 and f2 for 30 msec, the time constant circuit 25 may be omitted and the output of the detection judging circuit 24 may be used as the CAS detection signal $S_{DET}$ as is.

After this, the controller 11 mutes talking voices in step F103 by outputting the mute control signal $S_{MUTE}$ to the amplifier 6 to make the output of the amplifier 6 zero. In other words, voices from the microphone 9 are prevented from being sent to the public line.

Furthermore, the controller 11 begins checking the level comparison/judgment result signal $S_{LC}$ in step F104. In this check, for example, the controller 11 checks whether or not the level comparison/judgment result signal $S_{LC}$ becomes a signal indicating "no level difference detected" 10 msec after the mute processing.

If judged OK in both steps F105 and F106 as a result of the check started in steps F102 or F104, the controller 11 confirms CAS detection in step F107. On the other hand, if any of the results in steps F105 and F106 is judged NG, the controller 11 judges in step F108 that no CAS is entered. In other words, the controller 11 judges the CAS detection signal $S_{DET}$ detected in step F101 to be a wrong CAS mistaken due to talking voices containing frequencies f1 and f2.

In other words, this judgment of CAS input is made under the two conditions that the CAS detection signal $S_{DET}$ is entered continuously for over the specified time and the level comparison/judgment result signal $S_{LC}$ does not become a signal indicating "level difference detected" when the CAS detection signal $S_{DET}$ is entered continuously over the specified time.

This confirmation of the CAS input is made on the following bases.

Figure 1:
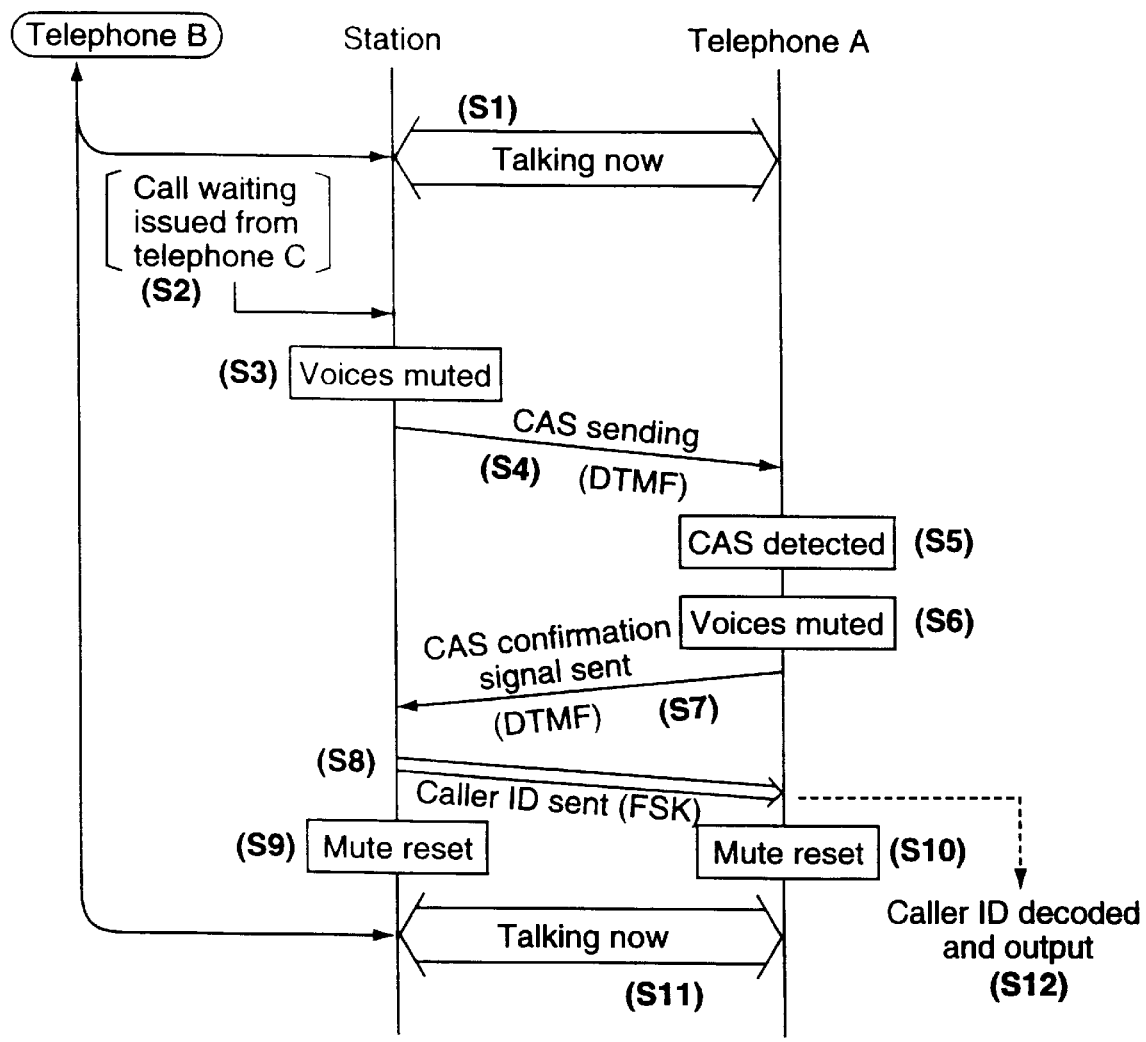
FIG. 1 explains a caller ID service operation.

As explained in FIG. 1, telephone stations send out CAS. Thus, detection of a normal CAS input must be kept even after the amplifier 6 mutes talking voices in step F103. However, if, when frequencies f1 and f2 are included in talking voices over a certain level, the CAS detection signal $S_{DET}$ is turned on during talking, the levels of frequencies f1 and f2 to be entered to the detection judging circuit 24 become zero after the talking voices are muted.

Consequently, every possibility to mistake talking voices for CAS can be eliminated by turning on the CAS detection signal $S_{DET}$ continuously for over 30 msec including the mute period as an input check condition in the processing of this embodiment.

Since an S/N ratio over 25 dB is assured for signals from telephone stations, energy level degradation of those signals to be caused by passing the band-pass filters 22 and 23 is low after talking voices are muted. In other words, the comparator provided in the level comparing/judging circuit 30 mentioned above can assure detection of level difference within 9 dB.

In spite of this, frequencies f1 and f2 are always included in talking voices from every caller's telephone over a certain level. If the CAS detection signal $S_{DET}$ is turned on during talking, the level comparison/judgment result signal $S_{LC}$ becomes a signal indicating "level difference detected". This is because many components other than frequencies f1 and f2 are usually included in signals in this case.

To avoid this problem, this embodiment specifies another input check condition, which prevents the level comparison/judgment result signal $S_{LC}$ from becoming a signal indicating "level difference detected" while the CAS detection signal $S_{DET}$ is on. Consequently, talking voices from a caller's telephone cannot be mistaken as a CAS any longer.

As explained above, this embodiment can eliminate every possibility to mistake any of caller's voice/listener's voice for a CAS, and can check every CAS input correctly and carry out necessary processings according to the CAS only when a CAS is sent from the telephone station.

Figure 7:
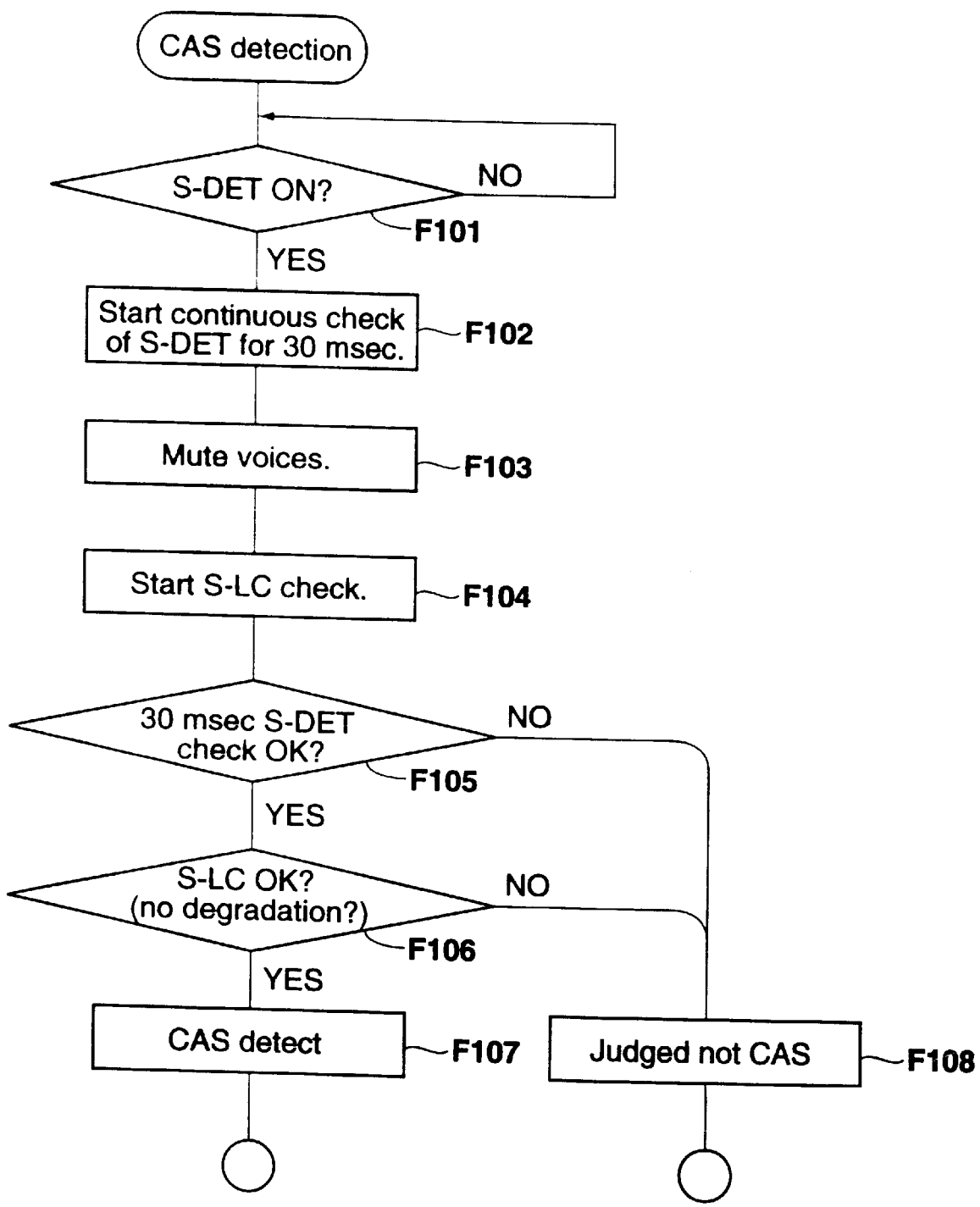
FIG. 7 is a flow chart for checking a CAS input in the embodiment of this invention.

The necessary processings mentioned above are processings carried out in the steps (S5), (S6), (S7), and (S10) shown in FIG. 7, as well as caller ID decoding (S12), display, etc. carried out according to received caller ID data as shown in FIG. 6.

A caller ID is sent as an FSK signal, but caller ID decoding carried out corresponding to the FSK method is carried out by the decoder 31 shown in FIG. 6. The decoder 31 supplies decoded caller ID data to the controller 11. The controller 11 instructs the display unit 13 to display the caller's telephone number, name, etc. according to the decoded data.

Although the embodiment of this invention is as explained above, this invention also allows many other variations of the embodiment to be adopted. For example, in the above embodiment, caller voices are muted as shown in FIG. 7 to avoid mistaking a caller voice for a CAS. However, since many frequency components other than f1 and f2 are also included in caller vices, the level comparison/judgment result signal $S_{LC}$ becomes a signal indicating "level difference detected" when a caller voice is detected wrong. Thus, the caller voice can be judged not to be a CAS input. In other words, this method can be used as a simple CAS checking method without muting caller voices.

Furthermore, although CAS is explained as a specific signal in the above embodiment, this invention also allows such a CAS to check inputs of signals comprising other specific frequencies properly.

What is claimed is:

1. A signal checking apparatus for checking whether a specific signal including one or more specified frequency signals within an audio signal range is present in entered audio range signal, said apparatus comprising:

first and second bandpass filter means for extracting first and second specified frequency signals from said entered audio range signal;

specific signal frequency detecting means for detecting whether there is any first frequency component forming said first specific frequency signal and any second frequency component forming said second specific frequency signal present in outputs of said first and second bandpass filter means and to output information of detected first and second frequency components;

adding means for adding together said outputs of said first and second bandpass filter means and producing a summed output signal;

level difference detecting means for detecting a level difference between said summed output from said adding means and said entered audio range signal to output detected level difference information; and judging means for judging whether there is an input of said specific signal based on both said information of detected frequency components and said information of detected level difference.

2. The signal checking apparatus as defined in claim 1, wherein:

said specific signal is a dual-tone signal generated from first and second frequencies in the audio signal range;

said specific signal frequency detecting means outputs information indicating a presence of the frequency components forming said specific signal when each output of said first and second bandpass filter means is equal to or greater than a predetermined level;

said level difference detecting means outputs information indicating "no level difference detected" as said detected level difference information when said detected level difference is less than a specified value; and said judging means judges that said specific signal is entered as a dual-tone signal when information indicating the existence of frequency components forming said specific signal is obtained as said information of detected frequency components and information indicating "no level difference detected" is obtained as said level difference information.

3. A telephone provided with a signal checker for checking whether a specific signal generated from one or more specified frequency signals within an audio signal range exists in a received audio range signal carries out a specified operation according to an input of said specific signal checked by said signal checker, wherein said signal checker comprises:

first and second bandpass filters for extracting first and second specified frequency signals from said received audio range signal;

specific signal frequency detecting means for detecting whether there is any first frequency component forming said first specific signal and any second frequency component forming said second specific signal in outputs from said first and second bandpass filters to output information of detected first and second frequency components;

an adder for adding said outputs from said first and second bandpass filters and producing a summed output signal;

level difference detecting means for detecting a level difference between said summed signal output from said adder and said received audio range signal to output information of a detected level difference; and judging means for judging whether there is an input of said specific signal based on said information of detected frequency components and said information of detected level difference.

4. A method for checking whether there is an input of a specific signal generated from one or more specified frequency signals within an audio signal range in received audio range signals, comprising the steps of:

using first and second bandpass filters for extracting first and second specified frequency signals from said received audio range signals to obtain a checked result whether there is a first frequency component and a second frequency component forming said specific signal;

adding together said first and second specified frequency signals and producing a summed signal;

judging a level difference between said received audio range signals and said summed signal; and detecting whether said specific signal is entered based on said checked result and on said detected level difference.

5. The method for checking signals as defined in claim 4, wherein:

said checked result whether there is a frequency component forming said specific signal is obtained from a level of said specified frequency signal extracted from the received audio range signals by said first and second bandpass filters, whereby said audio range signals are filtered, and said detected level difference is obtained by detecting a level difference between signals filtered by said first and second bandpass filters and said received audio range signals and by checking whether the detected level difference is within a specified value; and when an existence of said frequency component is detected as said checked results whether there is a frequency component forming said specific signal and when said level difference is judged to be within said specified value as said detected results of said level difference detection, it is determined the specific signal is received.

* * * * *